US012399455B2

(12) United States Patent
Kojima

(10) Patent No.: US 12,399,455 B2
(45) Date of Patent: Aug. 26, 2025

(54) IMAGE FORMING APPARATUS

(71) Applicant: Toshiba Tec Kabushiki Kaisha, Tokyo (JP)

(72) Inventor: Takahiro Kojima, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/648,875

(22) Filed: Apr. 29, 2024

(65) Prior Publication Data

US 2025/0138461 A1 May 1, 2025

(30) Foreign Application Priority Data

Oct. 26, 2023 (JP) ................................ 2023-184111

(51) Int. Cl.
*G03G 15/00* (2006.01)
*G03G 15/04* (2006.01)

(52) U.S. Cl.
CPC ......... *G03G 15/5058* (2013.01); *G03G 15/04* (2013.01); *G03G 2215/00059* (2013.01); *G03G 2215/0158* (2013.01); *G03G 2215/0161* (2013.01)

(58) Field of Classification Search
CPC ............... G03G 15/5058; G03G 15/04; G03G 2215/00059; G03G 2215/0161; G03G 2215/0158; G03G 15/043
See application file for complete search history.

(56) References Cited

U.S. PATENT DOCUMENTS

| | | | | |
|---|---|---|---|---|
| 2007/0160939 | A1 * | 7/2007 | Akamatsu .......... | G03G 15/5045 430/357 |
| 2008/0240754 | A1 * | 10/2008 | Kobayashi ......... | G03G 15/0194 399/46 |
| 2009/0208233 | A1 | 8/2009 | Hirai | |
| 2011/0286018 | A1 | 11/2011 | Hashizume | |
| 2017/0142278 | A1 | 5/2017 | Tanaka et al. | |
| 2022/0187753 | A1 * | 6/2022 | Maeda ............... | G03G 15/5058 |

FOREIGN PATENT DOCUMENTS

| | | |
|---|---|---|
| JP | 2016-170189 A | 9/2016 |

* cited by examiner

*Primary Examiner* — Sandra Brase
(74) *Attorney, Agent, or Firm* — Kim & Stewart LLP

(57) ABSTRACT

According to an embodiment, an image forming apparatus executes, if an execution frequency setting of positional deviation correction in setting information is equal to or larger than a reference value, the positional deviation correction by using an image pattern for positional deviation measurement that is formed to be equal to or larger than one cycle of a transfer belt. Further, the image forming apparatus executes, if the execution frequency setting of the positional deviation correction in the setting information is less than the reference value, the positional deviation correction by using an image pattern for positional deviation measurement that is formed to be smaller than one cycle of the transfer belt.

10 Claims, 5 Drawing Sheets

IMAGE FORMING APPARATUS

CROSS-REFERENCE TO RELATED APPLICATIONS

This application is based upon and claims the benefit of priority from the prior Japanese Patent Application No. 2023-184111, filed on Oct. 26, 2023, the entire contents of which are incorporated herein by reference.

FIELD

An embodiment described herein generally relates to an image forming apparatus.

BACKGROUND

In order to implement color printing, an image forming apparatus superimposes images that are formed using toner of respective colors. In the image forming apparatus, a position or an angle of a lens or a mirror is changed due to thermal expansion caused by a temperature rise in an exposure device, and thus a color shift may occur due to a deviation in an exposure position. For that reason, the image forming apparatus performs exposure-position correction control (color registration). In the exposure-position correction control, a patch for positional deviation measurement is formed on a transfer belt, and the patch formed on the transfer belt is read to detect the amount of deviation from an ideal position. Further, in the correction control, the deviation of the exposure position is corrected by changing an exposure timing on the basis of the detected amount of deviation.

An image forming apparatus of the related art performs exposure-position correction control in accordance with the amount of temperature change detected by temperature detection means such as a thermistor provided in an exposure device. Further, the exposure-position correction control may be performed also when a prescribed time has elapsed since the previous correction control. However, in the image forming apparatus of the related art, if execution conditions for the correction control are met, the correction control is started even when a user attempts to perform printing. When the exposure-position correction control is started, the image forming apparatus cannot perform printing until the correction control is terminated, which causes a problem that the user waits for printing for a long period of time.

DETAILED DESCRIPTION

Figure 1:
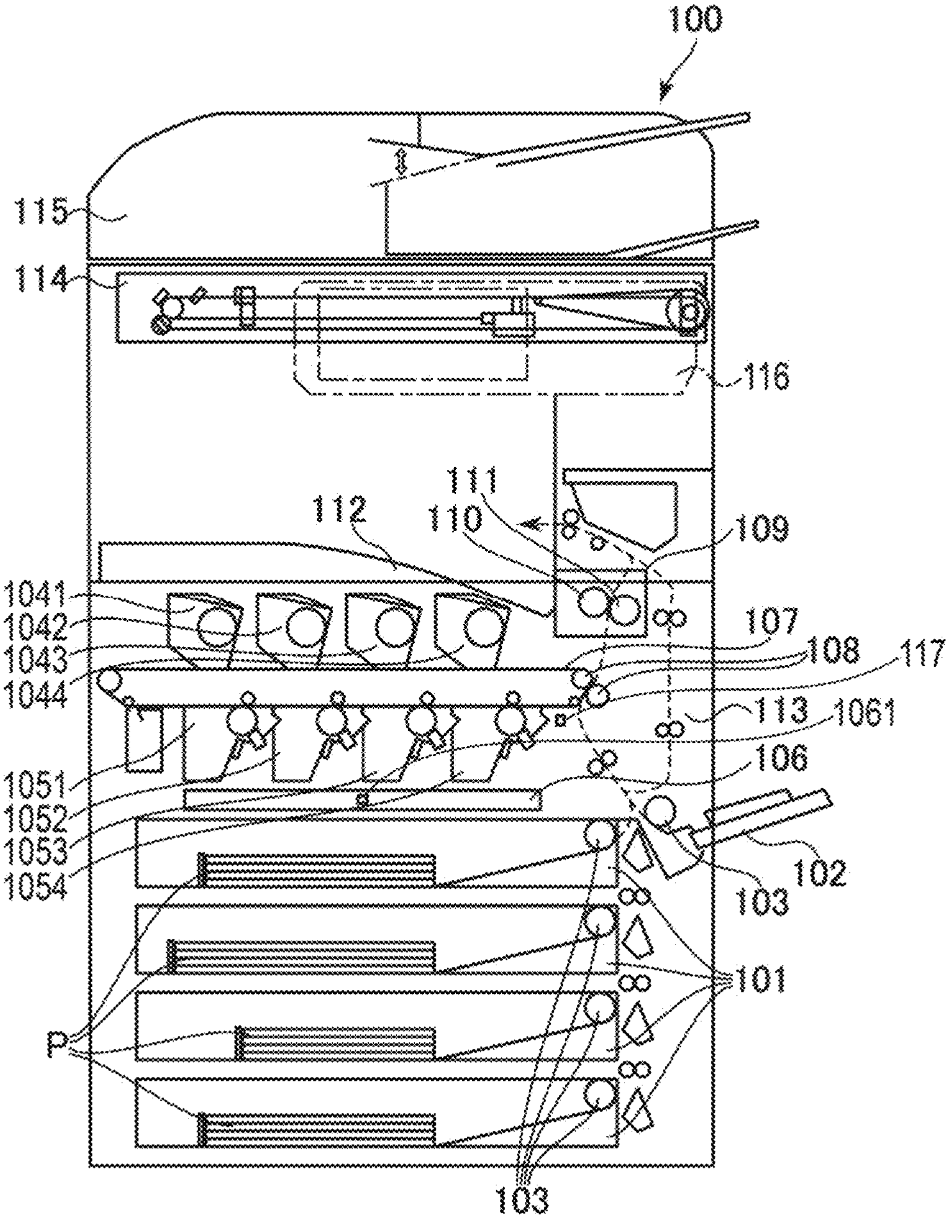
FIG. 1 is a diagram showing an example of an image forming apparatus according to an embodiment.

According to one embodiment, an image forming apparatus includes an exposure device, a transfer belt, a memory, and a processor. The exposure device forms an electrostatic latent image. The transfer belt includes an endless belt supported by a roller. A toner image is transferred to the transfer belt, the toner image being obtained by developing, with toner, the electrostatic latent image formed by the exposure device. The memory stores setting information related to positional deviation correction for correcting a deviation of an exposure position in the exposure device. The processor executes, if an execution frequency setting of the positional deviation correction in the setting information is equal to or larger than a predetermined value, the positional deviation correction by using an image pattern for positional deviation measurement that is formed to be equal to or larger than one cycle of the transfer belt. Further, the processor executes, if the execution frequency setting of the positional deviation correction in the setting information is less than the predetermined value, the positional deviation correction by using an image pattern for positional deviation measurement that is formed to be smaller than the one cycle of the transfer belt.

Hereinafter, an image forming apparatus according to an embodiment will be described with reference to the drawings. Note that the scale of each portion may be appropriately changed in the drawings to be used in the following description of the embodiment. Further, in the drawings to be used in the following description of the embodiment, some configurations may be omitted for easy understanding of the description. Furthermore, in the drawings, the same reference symbols denote the same or similar portions.

FIG. 1 is a diagram schematically showing a configuration example of an image forming apparatus 100 according to an embodiment. The image forming apparatus 100 is disposed in a workplace or the like. The image forming apparatus 100 performs printing by an electrophotographic method. The image forming apparatus 100 is, for example, a multifunction peripheral (MFP), a copying machine, a printer, or a facsimile machine.

As shown in FIG. 1, the image forming apparatus 100 includes a paper feed tray 101, a manual feed tray 102, a paper feed roller 103, a toner cartridge 104, an image forming unit 105, a transfer belt 107, a transfer roller 108, a fixing device 109, a heating unit 110, a pressure roller 111, a paper discharge tray 112, a double-sided unit 113, a scanner 114, a document feeder 115, a control panel 116, and the like.

The image forming unit 105 prints an image by an electrophotographic method. The image forming unit 105 forms an image to be printed on an image forming medium P or the like by using toner. The image forming medium P is, for example, sheet-like paper (paper). The scanner 114 reads an image from a document or the like on which the image is formed. For example, the image forming apparatus 100 prints the image, which is read from the document by the scanner 114, on the image forming medium P by the image forming unit 105, so that the image of the document is copied.

The paper feed tray 101 houses the image forming medium P to be used for printing. The manual feed tray 102 is a table for manually feeing the image forming medium P. The paper feed roller 103 is rotated by the action of a motor to convey the image forming medium P housed in the paper feed tray 101 or the manual feed tray 102 therefrom. The toner cartridge 104 stores toner to be supplied to the image forming unit 105.

The image forming apparatus 100 includes a plurality of toner cartridges 104. In the configuration example shown in FIG. 1, the image forming apparatus 100 includes four toner cartridges 104 of a toner cartridge 1041, a toner cartridge 1042, a toner cartridge 1043, and a toner cartridge 1044. The toner cartridge 1041, the toner cartridge 1042, the toner cartridge 1043, and the toner cartridge 1044 respectively store toner corresponding to colors of cyan, magenta, yellow, and key (black) (CMYK).

Note that the colors of the toner stored in the toner cartridges 104 are not limited to the colors of CMYK and may be other colors. Further, the toner stored in the toner cartridges 104 may be special toner. For example, the toner cartridge 104 may store toner capable of being decolorized, which is decolorized to be invisible at temperature higher than a predetermined temperature.

The image forming unit 105 includes a developing device, a photosensitive drum, and the like. The developing device develops an electrostatic latent image on the surface of the photosensitive drum by using the toner supplied from the toner cartridge 104. Accordingly, a toner image is formed on the surface of the photosensitive drum. The image formed on the surface of the photosensitive drum is transferred (primarily transferred) onto the transfer belt 107.

The image forming apparatus 100 includes a plurality of image forming units 105. In the example shown in FIG. 1, the image forming apparatus 100 includes four image forming units 105 of an image forming unit 1051, an image forming unit 1052, an image forming unit 1053, and an image forming unit 1054. The image forming unit 1051, the image forming unit 1052, the image forming unit 1053, and the image forming unit 1054 respectively receive the toner corresponding to the colors of CMYK and then form images.

The exposure device 106 is also referred to as a laser scanning unit (LSU) or the like. The exposure device 106 forms an electrostatic latent image on the surface of the photosensitive drum of each image forming unit 105, using a laser beam controlled in accordance with image data. The exposure device 106 includes, as an example, a housing, a laser unit, a polygon mirror, a polygon motor, a mirror, and a lens. Further, the exposure device 106 includes a temperature sensor 1061. The housing supports the laser unit, the polygon mirror, the polygon motor, the mirror, the lens, the temperature sensor 1061, and the like. The housing is made of resin, for example.

The exposure device 106 includes, as an example, laser units corresponding to the respective colors of CMYK. The laser units of the respective colors respectively emit laser beams. Each of the laser units controls the emission of the laser beam in accordance with a control signal corresponding to the image data. Further, each laser unit modulates the laser beam in accordance with a control signal corresponding to the image data.

The polygon mirror reflects the laser beam emitted from each laser unit. The polygon mirror is rotated by the polygon motor to scan polarization of each laser beam. The polygon motor is a motor that rotates the polygon mirror. The heat generated from the polygon motor is a major factor that raises the temperature of the exposure device 106. Therefore, the polygon motor is an example of a heat source. The mirror and the lens are optical elements for operating the laser beam. The mirror is provided such that its position or angle relative to the housing is adjustable.

The temperature sensor 1061 detects a temperature inside the exposure device 106. The temperature sensor 1061 is installed, as an example, in the housing of the exposure device 106 described above. The temperature sensor 1061 outputs the measured temperature. The temperature sensor 1061 is a thermistor, for example.

The transfer belt 107 is, for example, an endless belt supported by rollers. The transfer belt 107 is configured such that one cycle has a predetermined length. The transfer belt 107 is rotated by the action of the rollers. When the transfer belt 107 is rotated, the images are transferred (primarily transferred) by transfer rollers (primary transfer rollers) of the respective image forming units 1051 to 1054. The transfer belt 107 conveys the images (toner images) transferred from the image forming units 1051 to 1054 to the position of the transfer roller 108 (secondary transfer position).

The transfer roller 108 includes two rollers facing each other. The transfer roller 108 transfers (secondarily transfers) the images formed on the transfer belt 107 to the image forming medium P passing between the transfer rollers 108.

A toner sensor 117 detects the toner adhering to the transfer belt 107. The toner sensor 117 detects the toner images located on the transfer belt 107 in between a transfer position of the image forming unit 1054 (primary transfer position) and a position where the toner images located on the transfer belt 107 face the transfer roller 108 (secondary transfer position). For example, the toner sensor 117 is disposed to face the transfer belt 107 in between the transfer roller of the image forming unit 1054 and the transfer roller 108.

The fixing device 109 heats and pressurizes the image forming medium P onto which the images have been transferred. Accordingly, the images transferred onto the image forming medium P are fixed. The fixing device 109 includes a heating unit 110 and a pressure roller 111 facing each other. The heating unit 110 is, for example, a roller including a heat source for heating the heating unit 110. The heat source is, for example, a heater. The roller heated by the heat source heats the image forming medium P. The pressure roller 111 pressurizes the image forming medium P passing between the pressure roller 111 and the heating unit 110.

Further, the heating unit 110 may include an endless belt suspended by a plurality of rollers. For example, the heating unit 110 includes a plate-like heat source, an endless belt, a belt conveyance roller, a tension roller, and a press roller. The endless belt is, for example, a film-like member. The belt conveyance roller drives the endless belt. The tension roller applies tension to the endless belt. The press roller includes an elastic layer formed on the surface thereof. The plate-like heat source comes into contact with the inside of the endless belt on the heat generating portion side of the plate-like heat source, and is pressed in the direction of the press roller, so that a fixing nip with a predetermined width is formed between the plate-like heat source and the press roller. Since the plate-like heat source is configured to perform heating while forming a nip region, the responsiveness at the time of energization is higher than that of a heating method using a halogen lamp.

In the endless belt, for example, a silicon rubber layer having a thickness of 200 μm is formed on the outer side of a steel use stainless (SUS) base material having a thickness of 50 μm or a polyimide that is a heat-resistant resin having a thickness of 70 μm, and the outermost circumference thereof is covered with a surface protective layer of perfluoroalkoxy alkane (PFA) or the like. In the press roller, for example, a silicon sponge layer having a thickness of 5 mm is formed on a surface of an iron rod of φ10 mm, and the outermost circumference thereof is covered with a surface protective layer of PFA or the like. In the plate-like heat source, for example, a glaze layer and a heating resistance layer are laminated on a ceramic substrate. Further, in the plate-like heat source, a heat sink made of aluminum is bonded thereto in order to dissipate excess heat to the opposite side and prevent warpage of the substrate. The heating resistance layer is formed of, for example, a known material such as $TaSiO2$, and is divided into a predetermined length and a predetermined number in the main scanning direction.

The paper discharge tray 112 is a table on which the image forming medium P that has been subjected to printing is discharged. The double-sided unit 113 brings the image forming medium P into a state in which printing on the back surface is possible. For example, the double-sided unit 113 reverses the front and back sides of the image forming medium P by switching the direction of the image forming medium P backward by using a roller or the like.

The scanner 114 reads an image from a document. The scanner 114 is an image reading device for reading an image from a document. The scanner 114 is, for example, an optical-reduction-type image reading device including an imaging device such as a charge-coupled device (CCD) image sensor. Further, the scanner 114 may be a close-contact-sensor (contact image sensor (CIS))-type image reading device including an imaging device such as a complementary metal-oxide-semiconductor (CMOS) image sensor.

The document feeder 115 is also referred to as, for example, an auto document feeder (ADF). The document feeder 115 sequentially conveys documents placed on a tray for documents. Images of the conveyed documents are read by the scanner 114. Further, the document feeder 115 may include a scanner for reading images from the back surfaces of the documents.

The control panel 116 includes a button, a touch panel, and the like for an operator (user) of the image forming apparatus 100 to perform an operation. The control panel 116 includes an input device used for the user to input information, and a display device that displays an indication. The touch panel is, for example, a stack of a display, such as a liquid crystal display or an organic EL display, and a pointing device for a touch input. The button and the touch panel function as an input device that receives the operation made by the operator of the image forming apparatus 100. Further, the display included in the touch panel functions as a display device that notifies the operator of the image forming apparatus 100 of various types of information.

Figure 2:
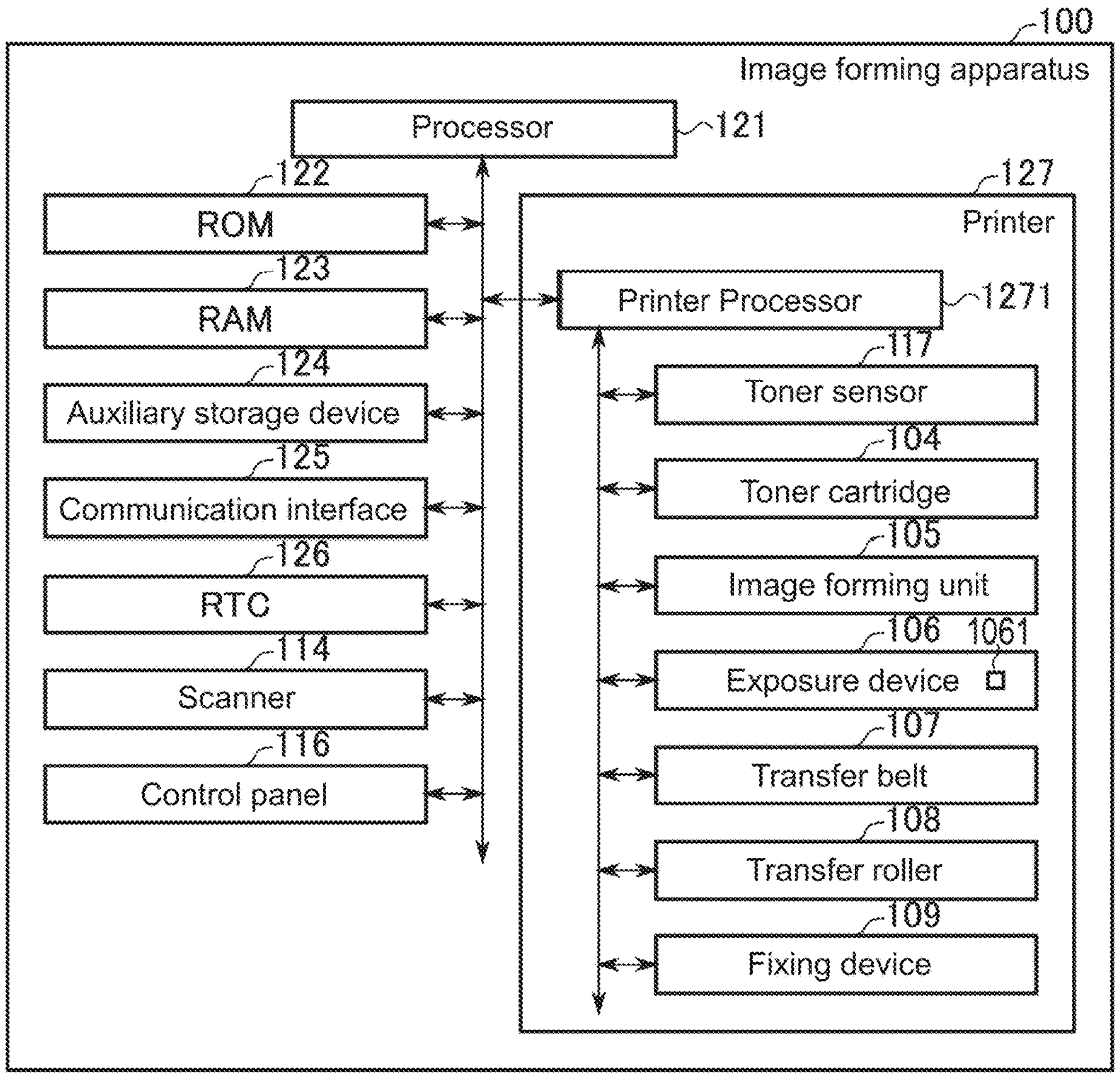
FIG. 2 is a block diagram showing a control system of the image forming apparatus according to the embodiment.

Next, a configuration of a control system of the image forming apparatus 100 according to the embodiment will be described. FIG. 2 is a block diagram showing a configuration example of the control system of the image forming apparatus 100 according to the embodiment. In the configuration example shown in FIG. 2, the image forming apparatus 100 includes a processor 121, a read-only memory (ROM) 122, a random-access memory (RAM) 123, an auxiliary storage device 124, a communication interface 125, a real-time clock (RTC) 126, a scanner 114, a printer 127, and a control panel 116.

The processor 121 corresponds to the central portion of a computer that performs processing such as calculation, control, and the like necessary for the operation of the image forming apparatus 100. The processor 121 controls each unit in order to implement various functions of the image forming apparatus 100 on the basis of a program such as system software, application software, or firmware stored in the ROM 122, the auxiliary storage device 124, or the like.

The processor 121 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Alternatively, the processor 121 may be a combination of some of those described above.

The ROM 122 corresponds to a main storage device of the computer in which the processor 121 is the nerve center. The ROM 122 is a nonvolatile memory exclusively used to read data. The ROM 122 stores the program described above. Further, the ROM 122 stores data necessary for the processor 121 to perform various types of processing, various setting values, and the like.

The RAM 123 corresponds to a main storage device of the computer in which the processor 121 is the nerve center. The RAM 123 is a memory used to read and write data. The RAM 123 is used as a so-called work area in which data used for the processor 121 to perform various types of processing is temporarily stored.

The auxiliary storage device 124 corresponds to an auxiliary storage device of the computer in which the processor 121 is the nerve center. The auxiliary storage device 124 is, for example, an electric erasable programmable read-only memory (EEPROM) (registered trademark), a hard disk drive (HDD), or a solid state drive (SSD). The auxiliary storage device 124 may store a program. Further, the auxiliary storage device 124 stores data used for the processor 121 to perform various types of processing, data generated by the processing of the processor 121, or various setting values. For example, the auxiliary storage device 124 is a memory that stores setting information of positional deviation correction, which includes an execution frequency setting of positional deviation correction.

Note that the image forming apparatus 100 may include an interface into which a storage medium such as a memory card or a universal serial bus (USB) memory can be inserted, instead of the auxiliary storage device 124 or in addition to the auxiliary storage device 124.

The program stored in the ROM 122 or the auxiliary storage device 124 includes a program for performing processing to be described later. As an example, in the image forming apparatus 100, a program is transferred to an administrator or the like of the image forming apparatus 100 with the program being stored in the ROM 122 or the auxiliary storage device 124. In the image forming apparatus 100, a program may also be transferred to an administrator or the like with the program being not stored in the ROM 122 or the auxiliary storage device 124.

Further, the program for performing processing to be described later may be written to the ROM 122 or the auxiliary storage device 124 by an operation of an administrator, a service person, or the like. The transfer of the program can be achieved, for example, by recording the program on a removable storage medium such as a magnetic disk, a magneto-optical disk, an optical disc, or a semiconductor memory or by downloading the program via a network or the like.

The communication interface 125 is an interface for the image forming apparatus 100 to communicate via a network or the like. The communication interface 125 is connected to a terminal apparatus operated by a user. The RTC 126 is a clock, a circuit incorporating a clock function, or the like.

The printer 127 prints an image on the image forming medium P or the like on the basis of image data. The printer 127 includes, in the configuration example shown in FIG. 2, a printer processor 1271, the toner sensor 117, the toner cartridge 104, the image forming unit 105, the exposure device 106, the transfer belt 107, the transfer roller 108, and the fixing device 109.

The printer processor 1271 performs processing such as calculation, control, and the like necessary for the printing operation of the image forming apparatus 100 in order to implement a printing function. The printer processor 1271 performs processing such as calculation, control, and the like necessary for the printing operation on the basis of an instruction or the like from the processor 121 and various programs. Further, the printer processor 1271 outputs a processing result or the like to the processor 121.

Note that various programs may be stored in a storage unit such as the ROM 122 or the auxiliary storage device 124 and may be incorporated in the circuit of the printer processor 1271. Further, the storage unit provided to the printer 127 may store various programs. The printer processor 1271 is, for example, a CPU, an MPU, an SoC, a DSP, a GPU, an ASIC, a PLD, or an FPGA.

The toner sensor 117 detects the toner adhering to the transfer belt 107. For example, the toner sensor 117 supplies a read (detection) result of an image pattern for positional deviation measurement, which is formed on the transfer belt 107, to the processor 121 or the printer processor 1271. Further, the toner sensor 117 may detect the amount of toner adhering to the transfer belt 107.

Next, description will be given on the exposure-position correction control (hereinafter, also referred to as positional deviation correction) for correcting a deviation of an exposure position in the image forming apparatus 100 according to the embodiment. In the image forming apparatus 100, the exposure device 106 may cause the deviation of the exposure position due to a temperature change or a temporal change. The image forming apparatus 100 has a function of performing the exposure-position correction control (positional deviation correction) for correcting the deviation of the exposure position in the exposure device 106. In the image forming apparatus 100, the positional deviation correction is performed under the control of the processor 121 or the printer processor 1271.

For example, as the positional deviation correction, the processor 121 forms a measurement patch (hereinafter, simply referred to as a patch) for measuring a positional deviation on the transfer belt 107. The processor 121 detects the amount of deviation an ideal position (reference position) in the measurement patch on which an image has formed. The processor 121 corrects the deviation of the exposure position by changing an exposure timing or the like of the exposure device 106 on the basis of the amount of deviation.

Figure 3:
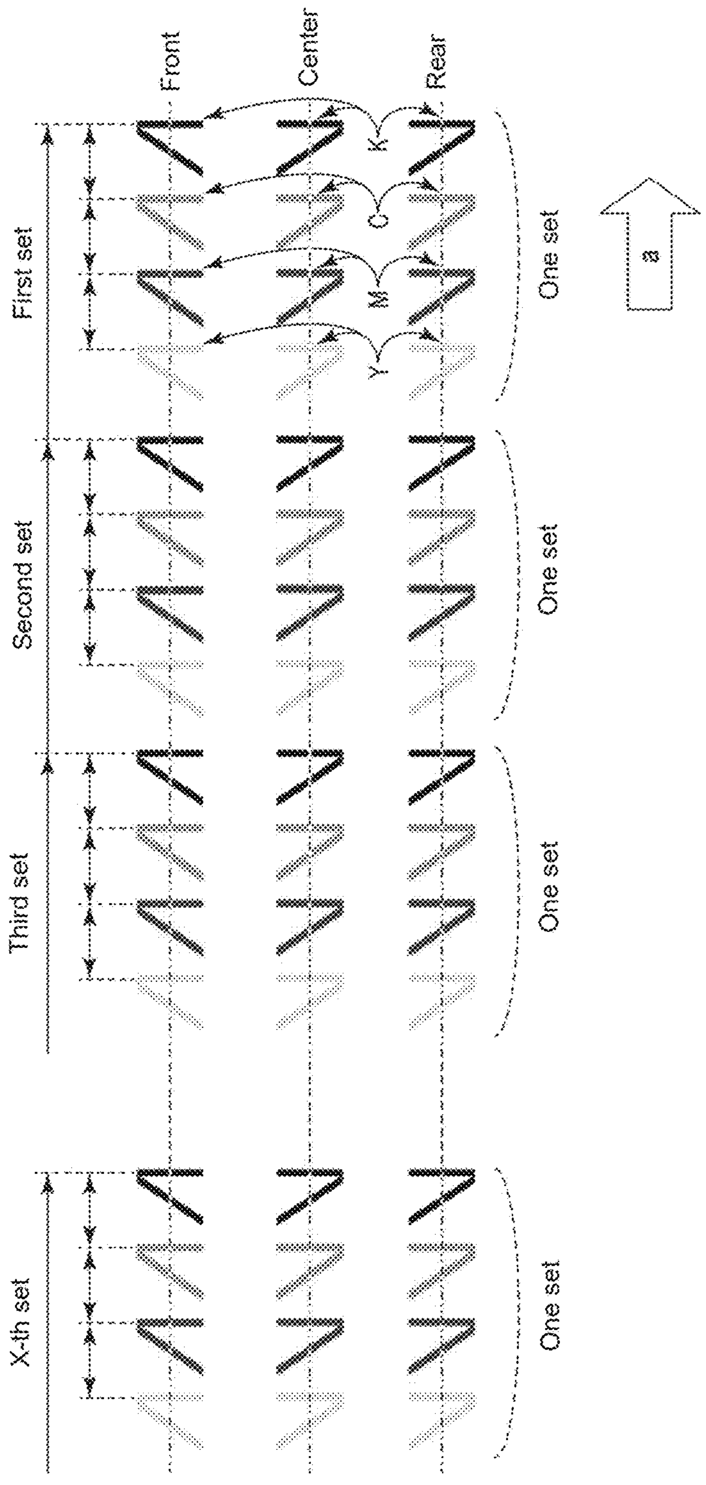
FIG. 3 is a diagram showing an example of patches for positional deviation measurement, which are used in exposure-position correction control in the image forming apparatus according to the embodiment.

FIG. 3 is a diagram showing an example of image patterns for positional deviation measurement, which are formed on the transfer belt 107 in order to measure a positional deviation. In the image patterns for positional deviation measurement, one set of patches shown in FIG. 3 is arranged in a conveying direction indicted by the arrow “a” shown in FIG. 3. In the one set of patches, image patterns Y, M, C, and K of the respective colors formed by the image forming units 1051 to 1554 of the respective colors are arranged in the conveying direction. Furthermore, the image patterns Y, M, C, and K of the respective colors are each configured such that a predetermined pattern (image pattern with wedge shape) is arranged at three locations of the front, the center, and the rear in a scanning direction orthogonal to the conveying direction.

An image for positional deviation measurement is formed by repeatedly forming one set of patches on the transfer belt 107 by a set number of times (the number of sets of patches). For example, when the number of sets of patches is X, one set of patches is repeatedly formed on the transfer belt 107 by X times, so that the image patterns for positional deviation measurement are formed.

The processor 121 reads, by the toner sensor 117, the image patterns for positional deviation measurement (toner images) formed on the transfer belt 107. The processor 121 calculates a relative positional deviation of the colors in the conveying direction and the scanning direction from a read result of the image patterns for positional deviation measurement. Accordingly, the processor 121 adjusts the exposure timing such that the image patterns of the respective colors (four colors) overlap with each other in accordance with the calculated positional deviation.

Note that the patches for measuring the positional deviation (one set of patches) are not limited to the image patterns shown in FIG. 3. For example, one set of patches is not limited to the patches arranged at the front, the center, and the rear in the scanning direction in a predetermined pattern, and image patterns may be disposed at two locations of the front and the rear. Further, the shape of a predetermined image pattern constituting each of the image patterns Y, M, C, and K of the respective colors is not limited to the shape (wedge shape) as shown in FIG. 3.

Figure 4:
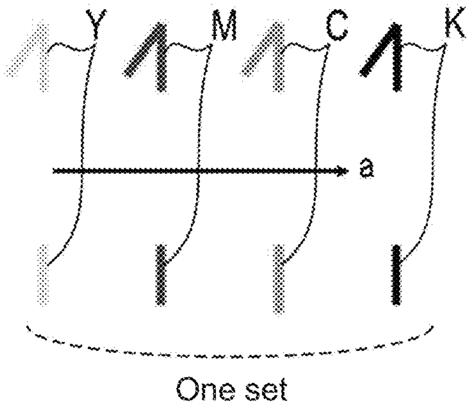
FIG. 4 is a diagram showing another example of the patches for positional deviation measurement, which are used in the exposure-position correction control in the image forming apparatus according to the embodiment.

FIG. 4 is a diagram showing another example of patches constituting image patterns for positional deviation measurement, which are formed on the transfer belt 107 in order to measure a positional deviation. In the example shown in FIG. 4, the image patterns of the patches constituting image patterns for positional deviation measurement are disposed at two locations of the front and the rear in the main scanning direction. Further, in the image patterns of the respective colors in the patches shown in FIG. 4, the front-side image pattern in the main scanning direction has a wedge shape, and the rear-side image pattern in the main scanning direction has a bar shape. The image patterns for positional deviation measurement may be image patterns including a predetermined number of the sets of patches as shown in FIG. 4 arranged in the conveying direction.

Next, the setting of the exposure-position correction control in the image forming apparatus 100 according to the embodiment will be described. In the image forming apparatus 100, it is conceivable that the deviation of the exposure position is caused due to a temperature change or a temporal change. For that reason, the image forming apparatus 100 sets a threshold for the amount of temperature change, an execution frequency (execution interval), and the like, as execution conditions for executing the positional deviation correction. The processor 121 changes (sets) the execution frequency (execution interval) and the like, which are the execution conditions for the positional deviation correction, in accordance with an instruction of the user. Further, the processor 121 of the image forming apparatus 100 may also set the number of sets of patches to be used in the positional deviation correction in accordance with an execution frequency setting instructed by the user.

For example, the user specifies the execution frequency of the positional deviation correction on the control panel 116. The processor 121 displays an operation screen for specifying the execution frequency on the touch panel of the control panel 116 and receives the execution frequency specified by the user. As a specific example, the user specifies an increase or decrease in the execution frequency of the positional deviation correction or the length of the execution interval thereof on the basis of a standard value on the control panel 116. The processor 121 sets (updates) the execution frequency setting included in the setting information of the positional deviation correction in accordance with the execution frequency of the positional deviation correction instructed by the user. The processor 121 determines whether to execute the positional deviation correction on the basis of whether or not the execution conditions indicated by the set execution frequency setting and the like have been met.

Further, when executing the positional deviation correction, the processor 121 sets the number of sets of patches to be used in the positional deviation correction in accordance with the execution frequency indicated by the execution frequency setting. If the execution frequency (execution interval) indicated by the execution frequency setting is equal to or larger than a predetermined value (reference value), the processor 121 executes the positional deviation correction using a standard number of sets of patches. An image pattern for positional deviation measurement in which a standard number of sets of patches are arranged is set so as to be formed in a range longer than one cycle of the transfer belt 107.

If the execution frequency indicated by the execution frequency setting is less than the predetermined value, the processor 121 executes the positional deviation correction using an image pattern (image pattern for positional deviation measurement) formed in a range shorter than one cycle of the transfer belt 107. The processor 121 forms an image pattern for positional deviation measurement, which is shorter than one cycle of the transfer belt 107, by arranging a smaller number of sets of patches than the standard number of sets of patches.

For example, it is assumed that the length of one cycle of the transfer belt 107 is 800 mm, and the length of one set of patches in the conveying direction is 100 mm or more. In this case, if the execution frequency indicated by the execution frequency setting is equal to or larger than a predetermined value, the processor 121 uses an image in which eight sets of patches are arranged in the conveying direction as the image pattern for positional deviation measurement. Accordingly, if the execution frequency indicated by the execution frequency setting is equal to or larger than the predetermined value, the image pattern for positional deviation measurement is formed in a range longer than one cycle of the transfer belt 107.

Further, if the execution frequency indicated by the execution frequency setting is less than the predetermined value, the processor 121 forms an image pattern for positional deviation measurement by using four sets of patches that are half of the standard number of sets of patches. In this case, the image pattern for positional deviation measurement, which includes four sets of patches arranged in the conveying direction, is formed in a range shorter than one cycle of the transfer belt 107. As a result, if the execution frequency indicated by the execution frequency setting is less than the predetermined value, the image pattern for positional deviation measurement is formed in a range shorter than one cycle of the transfer belt 107.

For example, if it takes four seconds to read an image in which eight sets of patches are arranged in the conveying direction, it takes two seconds to read an image in which four sets of patches are arranged. Therefore, it takes a shorter time to read the image pattern for positional deviation measurement as the number of sets of patches arranged in the conveying direction becomes smaller.

Meanwhile, if the patches for positional deviation measurement are formed to be equal to or larger than one cycle of the transfer belt 107, the positional deviation of the entire transfer belt 107 can be detected, so that a high-accuracy positional deviation correction can be achieved. If the patches for positional deviation measurement are formed to be less than one cycle of the transfer belt 107, a positional deviation is detected in a part of the transfer belt 107, so that it is assumed that the accuracy of the positional deviation correction is reduced. However, actually, even if the standard number of sets of patches is eight and the number of sets of patches is changed to four, a reduction in accuracy of the positional deviation correction that can be discriminated with human eyes is not caused.

In other words, even if the positional deviation correction is executed using the patches formed in a range smaller than one cycle of the transfer belt 107, the accuracy of the positional deviation correction requested as an actual operation can be ensured in some cases. When the user specifies the execution frequency of the positional deviation correction to be less than the predetermined value (reference value), the image forming apparatus 100 sets the number of sets of patches such that the patches are formed in a range smaller than one cycle of the transfer belt 107. Accordingly, if the execution frequency indicated by the execution frequency setting is less than the predetermined value, the image forming apparatus 100 according to the embodiment can shorten an execution time of the positional deviation correction.

Further, the number of sets of patches may be reduced as long as the accuracy of the positional deviation correction allowed as an actual operation can be ensured. For example, the image forming apparatus 100 may set the number of sets of patches to be reduced in a stepwise manner in the allowed range. In this case, the processor 121 reduces the number of sets of patches in a stepwise manner in accordance with the reduction of the execution frequency if the execution frequency indicated by the execution frequency setting is less than the predetermined value.

Accordingly, as the user sets the execution frequency of the positional deviation correction to be smaller (the execution interval to be longer), the image forming apparatus can reduce the number of sets of patches in the image for specifying a positional deviation. As a result, as the user sets the execution frequency of the positional deviation correction to be smaller (the execution interval to be longer), the image forming apparatus can also shorten an execution time of the positional deviation correction.

Note that the user may specify a correction accuracy by the positional deviation correction, instead of the execution frequency or the execution interval of the positional deviation correction. If the user specifies a correction accuracy lower than the standard, the image forming apparatus may reduce the number of sets of patches constituting the image pattern for positional deviation measurement in an allowable range. Accordingly, the image forming apparatus can shorten the execution time of the positional deviation correction if the user lowers the accuracy of the positional deviation correction.

Figure 5:
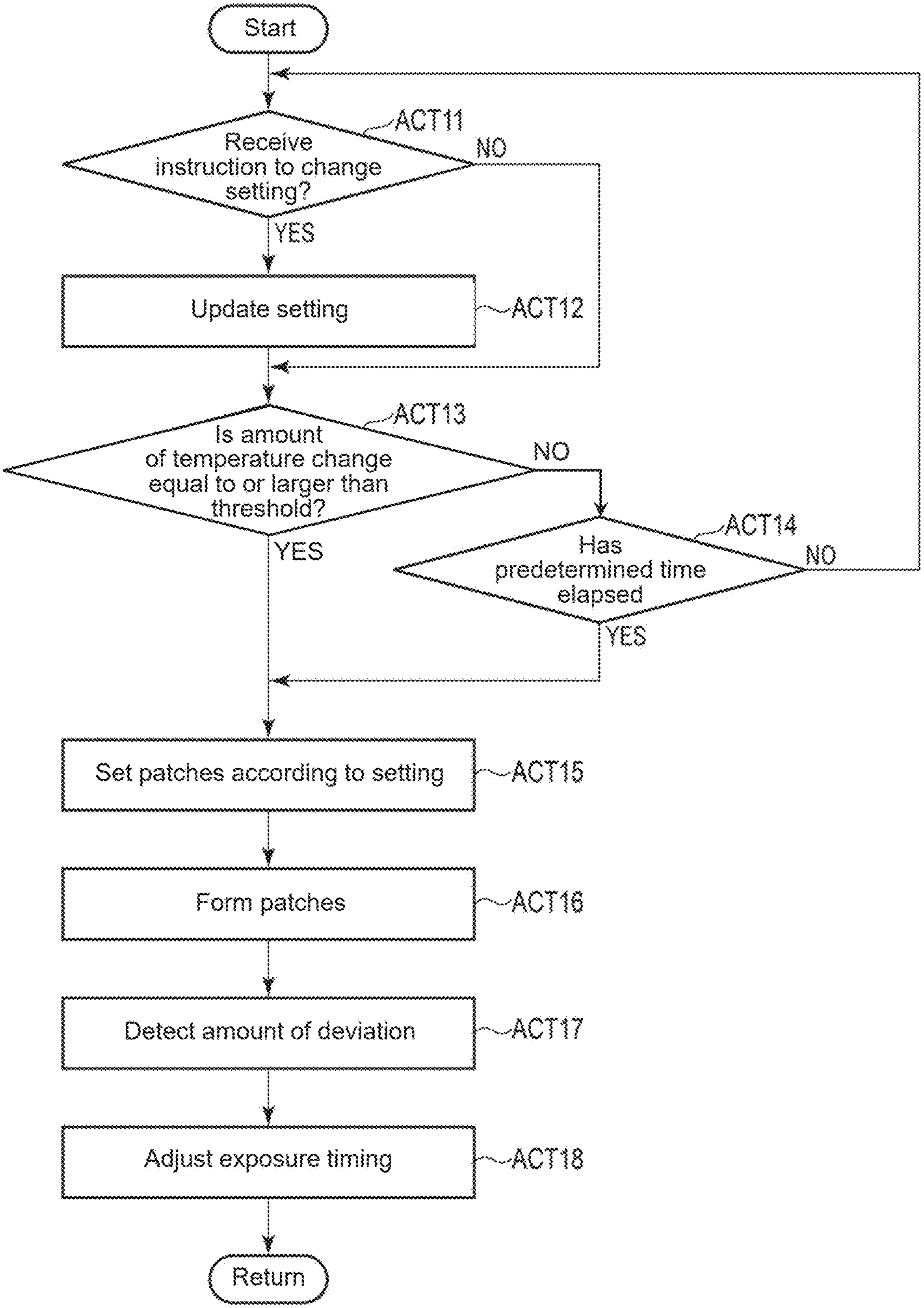
FIG. 5 is a flowchart showing an operation example of the exposure-position correction control in the image forming apparatus according to the embodiment.

Next, an operation of the exposure-position correction control (positional deviation correction) in the image forming apparatus 100 according to the embodiment will be described. FIG. 5 is a flowchart for describing an operation example of the exposure-position correction control (positional deviation correction) in the image forming apparatus 100 according to the embodiment. In the image forming apparatus 100, the processor 121 receives an instruction to change a setting related to the positional deviation correction (ACT11). The setting related to the positional deviation correction includes the execution frequency, the execution interval, and the like that are execution conditions for the positional deviation correction. The processor 121 receives an instruction to change the execution conditions or the like, as the change of the setting related to the positional deviation correction by the user.

For example, the user specifies, on the control panel 116, the execution frequency of the positional deviation correction as the execution condition for the positional deviation correction. As a specific example, the user specifies, on the control panel 116, an increase or decrease in the execution frequency or the length of the execution interval of the positional deviation correction on the basis of the standard value. Further, the user may specify a correction accuracy of the positional deviation correction, instead of the execution frequency or the execution interval of the positional deviation correction. Also in this case, the correction accuracy may be specified on the basis of the standard value.

Further, the processor 121 may receive an instruction to set an execution condition for the positional deviation correction from an external terminal apparatus connected via the communication interface 125. In this case, the user specifies the execution frequency of the positional deviation correction as an execution condition for the positional deviation correction, in the external terminal apparatus connected via the communication interface 125. As a specific example, the user may specify, in the terminal apparatus, an increase or decrease in the execution frequency or the length of the execution interval of the positional deviation correction on the basis of the standard value.

Upon reception of the instruction to change the execution condition by the user, the processor 121 updates the setting related to the positional deviation correction, such as the execution frequency, in accordance with the setting details instructed by the user (ACT12). Here, the setting information related to the positional deviation correction is stored in the auxiliary storage device (memory) 124. The setting information related to the positional deviation correction includes information indicating the execution condition for the positional deviation correction. A threshold for the amount of temperature change for executing the positional deviation correction, and the execution frequency (execution interval) are set as the execution conditions.

For example, if the processor 121 receives an instruction to change the execution frequency setting of the positional deviation correction by the user, the processor 121 updates the execution frequency setting of the positional deviation correction in accordance with the instruction by the user. The execution frequency setting is information indicating an elapsed time (execution interval of positional deviation correction) until the positional deviation correction is executed. Further, the processor 121 may also store, as setting information, information indicating the number of sets of patches in the image pattern for positional deviation measurement according to the execution frequency setting, in the memory.

The processor 121 determines whether or not the execution conditions indicated by the setting information related to the positional deviation correction have been met. Here, it is assumed that the image forming apparatus 100 sets the threshold of the amount of temperature change and the elapsed time (execution interval) as the execution conditions. In other words, the processor 121 specifies the amount of temperature change on the basis of the temperature detected by the temperature sensor 1061, and determines whether or not the amount of temperature change reaches a threshold serving as the execution condition (ACT13). If the amount of temperature change does not reach the threshold (NO in ACT13), the processor 121 further determines whether or not a predetermined time (execution interval) for executing the positional deviation correction has elapsed (ACT14).

If the amount of temperature change is less than the threshold and also if a predetermined time to execute the positional deviation correction has not elapsed (NO in ACT14), the processor 121 returns to ACT11 described above and executes the processing described above.

If the amount of temperature change is equal to or larger than the threshold (YES in ACT13) or a predetermined time has elapsed (YES in ACT14), the processor 121 determines that the positional deviation correction is to be executed. If the positional deviation correction is executed, the processor 121 sets the number of sets of patches according to the setting of the positional deviation correction (ACT15). As described above, the processor 121 specifies the number of sets of patches to be used in the positional deviation correction in accordance with the execution frequency setting included in the setting of the positional deviation correction. The processor 121 sets the number of sets of patches that is the number of times by which one set of patches is repeatedly formed on the transfer belt 107.

After setting the number of sets of patches, the processor 121 forms images of the set number of sets of patches on the transfer belt 107 (ACT16). The processor 121 repeatedly performs the processing of forming an image of one set of patches on the transfer belt 107 by using the image forming units 1051 to 1054 by the number of times corresponding to the number of sets of patches. Accordingly, an image pattern for position measurement, in which the sets of patches in the set number are arranged in the conveying direction, is formed on the transfer belt 107.

The processor 121 calculates a relative positional deviation of the colors in the conveying direction and the scanning direction from a read result of the image pattern for positional deviation measurement, which is formed on the transfer belt 107 (ACT17). For example, the processor 121 reads the image pattern for positional deviation measurement, which is formed on the transfer belt 107, by the toner sensor 117, and acquires a read result thereof. The processor 121 detects the amount of deviation of each color on the basis of the acquired read result of the image pattern for positional deviation measurement.

Upon detection of the positional deviation, the processor 121 adjusts a control value related to the exposure control on the exposure device 106 such that the image patterns of the respective colors (four colors) overlap with each other in accordance with the detected deviation (ACT18). For example, the processor 121 adjusts an exposure timing in accordance with the amount of deviation of each color and thus adjusts the images of the respective colors so as to overlap with each other. Accordingly, the processor 121 can achieve correction of the positional deviation by using the image pattern for positional deviation measurement according to the execution frequency setting.

As described above, the image forming apparatus according to the embodiment sets the image pattern for positional deviation measurement in accordance with the execution frequency setting for the correction control of the exposure positional deviation (positional deviation correction). If the execution frequency setting of the positional deviation correction is equal to or larger than a predetermined value, the image forming apparatus executes the positional deviation correction by using an image pattern for positional deviation measurement, which is formed in a range equal to or larger than one cycle of the transfer belt. If the execution frequency setting of the positional deviation correction is less than the predetermined value, the image forming apparatus executes the positional deviation correction by using an image pattern for positional deviation measurement, which is formed in a range smaller than one cycle of the transfer belt.

Accordingly, if the execution frequency specified by the user is less than the reference value, the image forming apparatus can form the image for positional deviation measurement in a range smaller than one cycle of the transfer belt and can shorten a time taken to perform the correction. As a result, the user who specifies the execution frequency setting to be less than the reference value can reduce a waiting time for the exposure-position correction control.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:

an exposure device that forms an electrostatic latent image;

a transfer belt that includes an endless belt supported by a roller, a toner image being transferred to the transfer belt, the toner image being obtained by developing, with toner, the electrostatic latent image formed by the exposure device;

a memory that stores setting information related to positional deviation correction for correcting a deviation of an exposure position in the exposure device; and a processor configured to execute, if an execution frequency setting of the positional deviation correction in the setting information is equal to or larger than a predetermined value, the positional deviation correction by using an image pattern for positional deviation measurement that is formed to be equal to or larger than one cycle of the transfer belt, and execute, if the execution frequency setting of the positional deviation correction in the setting information is less than the predetermined value, the positional deviation correction by using an image pattern for positional deviation measurement that is formed to be smaller than the one cycle of the transfer belt.

2. The image forming apparatus according to claim 1, wherein the image pattern for positional deviation measurement is an image pattern formed by repeating one set of patches.

3. The image forming apparatus according to claim 1, wherein the processor forms, if the execution frequency setting is equal to or larger than the predetermined value, an image pattern for positional deviation measurement in which a standard number of sets of patches are arranged, on the transfer belt, and forms, if the execution frequency setting is less than the predetermined value, an image pattern for positional deviation measurement in which a smaller number of sets of patches than the standard number of sets of patches are arranged, on the transfer belt.

4. The image forming apparatus according to claim 3, wherein the processor forms, if the execution frequency setting is less than the predetermined value, an image pattern for positional deviation measurement in which the sets of patches equal to or smaller in number than a half of the standard number of sets of patches are arranged, on the transfer belt.

5. The image forming apparatus according to claim 3, wherein the processor forms, if the execution frequency setting is less than the predetermined value, an image pattern for positional deviation measurement in which the number of sets of patches is reduced as an execution frequency indicated by the execution frequency setting becomes smaller, on the transfer belt.

6. The image forming apparatus according to claim 1, further comprising an input device to which information is input by a user, wherein the processor updates the setting information related to the positional deviation correction, which is stored in the memory, in accordance with the information input using the input device.

7. The image forming apparatus according to claim 6, wherein the processor updates, if an instruction to reduce the execution frequency setting of the positional deviation correction to be smaller than a standard is input using the input device, the execution frequency setting of the positional deviation correction to be less than the predetermined value.

8. The image forming apparatus according to claim 6, wherein the processor updates, if an instruction to reduce an accuracy of the positional deviation correction to be smaller than a standard is input using the input device, the execution frequency setting of the positional deviation correction to be less than the predetermined value.

9. The image forming apparatus according to claim 1, further comprising a communication interface that is connected to a terminal apparatus, wherein the processor updates the setting information related to the positional deviation correction, which is stored in the memory, in accordance with information input using the terminal apparatus.

10. The image forming apparatus according to claim 9, wherein the processor updates, if an instruction to reduce the execution frequency setting of the positional deviation correction to be smaller than a standard is input using the terminal apparatus, the execution frequency setting of the positional deviation correction to be less than the predetermined value.

* * * * *